(12) United States Patent
Chen (10) Patent No.: US 11,313,501 B2
(45) Date of Patent: *Apr. 26, 2022

(54) HOSE CONNECTOR (71) Applicant: SHIN TAI SPURT WATER OF THE GARDEN TOOLS CO., LTD., Chang-Hua Hsien (TW)

(72) Inventor: Chin-Yuan Chen, Lu-Kang Town (TW)

(73) Assignee: SHIN TAI SPURT WATER OF THE GARDEN TOOLS CO., LTD., Chang-Hua Hsien (TW)

( * ) Notice: Subject to any disclaimer, the term of this patent is extended or adjusted under 35 U.S.C. 154(b) by 197 days.

This patent is subject to a terminal disclaimer.

(21) Appl. No.: 16/686,173

(22) Filed: Nov. 17, 2019

(65) Prior Publication Data

US 2020/0347975 A1 Nov. 5, 2020

Related U.S. Application Data

(63) Continuation of application No. 16/401,197, filed on May 2, 2019.

(51) Int. Cl.
| | |
|---|---|
| *B05B 9/01* | (2006.01) |
| *B05B 15/65* | (2018.01) |
| *B05B 15/658* | (2018.01) |
| *F16L 27/08* | (2006.01) |

(Continued)

(52) U.S. Cl.
CPC .............. *F16L 33/24* (2013.01); *B05B 15/65* (2018.02); *B05B 9/01* (2013.01); *B05B 15/658* (2018.02); *F16L 27/0804* (2013.01); *F16L 27/0816* (2013.01); *F16L 33/223* (2013.01)

(58) Field of Classification Search
CPC ... F16L 33/24; F16L 19/0212; F16L 19/0218; F16L 33/20; F16L 33/18; F16L 33/22; F16L 19/0231; F16L 19/025; F16L 27/0816; F16L 33/223; F16L 33/32; F16L 27/08; F16L 27/082; F16L 27/0804; B05B 9/01; B05B 9/15652; B05B 15/654; B05B 15/68; B05B 15/63
USPC ... 285/425, 5, 353, 354, 355, 357, 336, 379, 285/385, 389, 388, 387, 238, 282
See application file for complete search history.

(56) References Cited

U.S. PATENT DOCUMENTS

| | | | |
|---|---|---|---|
| 7,390,033 B2 * | 6/2008 | Weick | 285/354 |
| 2006/0273585 A1 * | 12/2006 | Chung | 285/354 |

(Continued)

*Primary Examiner* — Matthew Troutman
*Assistant Examiner* — William S. Choi (57) ABSTRACT

A hose connector has a first connecting joint, a second connecting joint, and a connecting duct. The first connecting joint comprises an inner neck rim having an inner threaded aperture and a containment space connecting to the inner threaded aperture. The first connecting joint further comprises a threaded outer wall, and a bottom surface of the neck rim has a plurality of engaging grooves. The second connecting joint comprises a hollow base having a neck section connected to a lip, and the neck section is configured for insertion in the containment space of the first connecting joint. A top surface of the lip has a plurality of engaging protrusions pushing against the neck rim or engaging with the engaging groove. The connecting duct comprises an outer threaded section and an enlarged flange, and the connecting duct is mounted through the neck section and the lip.

7 Claims, 10 Drawing Sheets

(51) Int. Cl.
   *F16L 33/22*   (2006.01)
   *F16L 33/24*   (2006.01)

(56) References Cited

U.S. PATENT DOCUMENTS

2007/0075541 A1* 4/2007 Wu .................... F16L 27/0816
2011/0057435 A1* 3/2011 Tong .................... F16L 33/223
                                                          285/5

* cited by examiner

PRIOR ART

FIG.12

PRIOR ART

FIG.13
PRIOR ART

HOSE CONNECTOR

BACKGROUND of INVENTION

Field of Invention

The present invention relates to a hose connector, and more particularly to a hose connector preventing from tangling and twisting.

Description of the Related Art

Currently, when the water spray needs to be operated in different directions or angles, the spray head will have a rotating or twisting force on the water pipe, and the external force will cause the water pipe to be twisted or wound to solve this problem, as shown in FIGS. 10-13. This application is a continuation in part of U.S. patent application Ser. No. 16/401,197 is incorporated herein by reference, a hose connector comprises: a cap 60, having an inner ring 601 and an outer ring 602 connected by a dividing lip 603. The inner ring 601 is provided with an inner threaded hole 604. The cap 60 further has a socket hole 605 connected with the inner threaded hole 604. The outer ring 602 is provided with an outer threaded section 606, and the dividing lip 603 is further provided with a plurality of grooves 607 facing the socket hole 605. The connecting pipe 61 has an inserting portion 611 at one end and a first threaded portion 612 at another end. The inserting portion 611 comprises a through hole 613 and an end of the inserting portion 611 further comprises a stopping ring 614. The stopping ring 614 comprises at least one protrusion 615 facing the groove 607. A assembly pipe 62 has a hexagonal through hole 621 and a convex ring 622 at one end and a second threaded portion 623 at another end. The assembly pipe 62 is disposed in the through hole 613 of the connecting pipe 61, and the second threaded portion 623 of the assembly pipe 62 engaging with the inner threaded hole 604 of the cap 60 such that the convex ring 622 abuts against the stopping ring 614 of the connecting pipe 60 to allow the connecting pipe 62 and the cap 60 to be rotate relatively.

However, it is found that the above-mentioned prior structure still has some incompleteness in use: (1) the groove 607 is larger than the protrusion 615, and the connecting pipe 61 only has two protrusions 615 embedded in the groove 607. When the connecting pipe 61 drives the sleeve 60 to be screwed, the contact points are too small and the contact area are too small, and the connecting pipe 61 produces an abnormal swaying so that the force cannot be smoothly transmitted to the cap. (2) when the connecting pipe 61 is in the non-rotating state, the two protrusions 615 detach from the groove 607 and pushes against the dividing lip 603 with the two protrusions 615, and the contact area and the contact point are small which is not able to produce a stable support, so that the connecting pipe 61 will be pulled by the water pipe in all directions, and then it will be warped or even stuck in use.

Therefore, it is desirable to provide a driving structure of a garden sprinkler to mitigate and/or obviate the aforementioned problems.

SUMMARY OF THE INVENTION

An objective of present invention is to provide a hose connector, which is capable of improving the above-mention problems.

In order to achieve the above mentioned objective, a hose connector has a first connecting joint, a second connecting joint, and a connecting duct. The first connecting joint comprises an inner neck rim having an inner threaded aperture and a containment space connecting to the inner threaded aperture below the neck rim, the first connecting joint further comprising a threaded outer wall, and a bottom surface of the neck rim above the containment space having a plurality of engaging grooves. The second connecting joint comprises a hollow base having a neck section connected to a lip, the neck section of the second connecting joint configured for insertion in the containment space of the first connecting joint, a top surface of the lip having a plurality of engaging protrusions pushing against the neck rim or engaging with the engaging groove. The connecting duct comprises an outer threaded section and an enlarged flange, the connecting duct mounted through the neck section and the lip of the second connecting joint such that the outer threaded section of the connecting duct engages with the inner threaded aperture of the first connecting joint. With the lip and the flange abutting against each other, the connecting duct is blocked from escaping from the second connecting joint such that the second connecting joint is capable of rotation relative to the combination of the first connecting joint and the connecting duct.

Other objects, advantages, and novel features of invention will become more apparent from the following detailed description when taken in conjunction with the accompanying drawings.

DETAILED DESCRIPTION OF THE PREFERRED EMBODIMENT

First, please refer to FIGS. 1-4. A hose connector comprises: a first connecting joint 10, a second connecting joint 20 and a connecting duct 30. The first connecting joint 10 comprises an inner neck rim 11 having an inner threaded aperture 12 and a containment space 13 connecting to the inner threaded aperture 12 below the neck rim 11. The first connecting joint further comprising a threaded outer wall 101, and a bottom surface of the neck rim 11 above the containment space 13 having a plurality of engaging grooves 111. The second connecting joint 20 comprises a hollow base 21 having a neck section 22 connected to a lip 23, and the neck section 22 of the second connecting joint 20 is configured for insertion in the containment space 13 of the first connecting joint 10. A top surface of the lip 23 has a plurality of engaging protrusions 231 pushing against the neck rim 11 or engaging with the engaging groove 111. The connecting duct 30 comprises an outer threaded section 31 and an enlarged flange 32. The connecting duct 30 is mounted through the neck section 22 and the lip 23 of the second connecting joint 20 such that the outer threaded section 31 of the connecting duct 30 engages with the inner threaded aperture 12 of the first connecting joint 10. With the restraint between the lip 23 and the flange 32, the connecting duct 30 is blocked from escaping directly from the second connecting joint 20, so that the second connecting joint 20 is capable of rotating relative to the combination of the first connecting joint 10 and the connecting duct 30.

The neck section 22 of the second connecting joint 20 is sleeved with at least one sealing ring 24 making contact with an inner wall of the containment space 13.

The hollow base 21 is mounted with a sealing washer 25 and provided with an anti-slip surface.

The lip 23 has four engaging protrusions 231, please refer to FIGS. 1-8, the four engaging protrusions 231 makes multiple contact points and provides stability to the second connecting joint 20.

Figure 9:
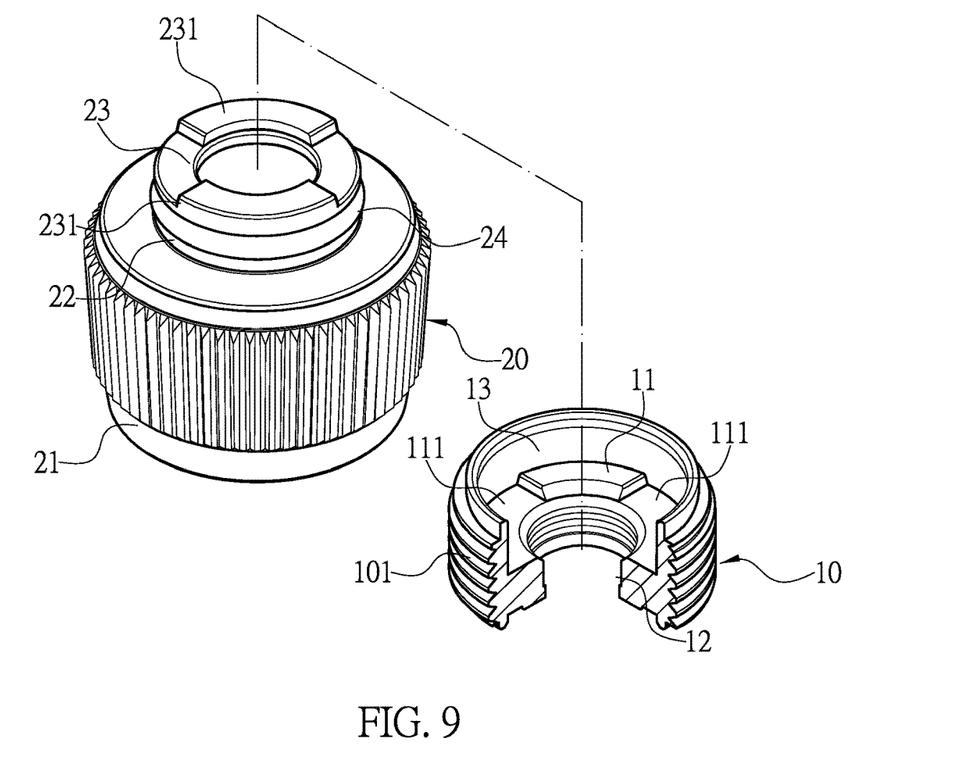
FIG. 9 is a perspective exploded view of another preferred embodiment of the present invention.
Figure 10:
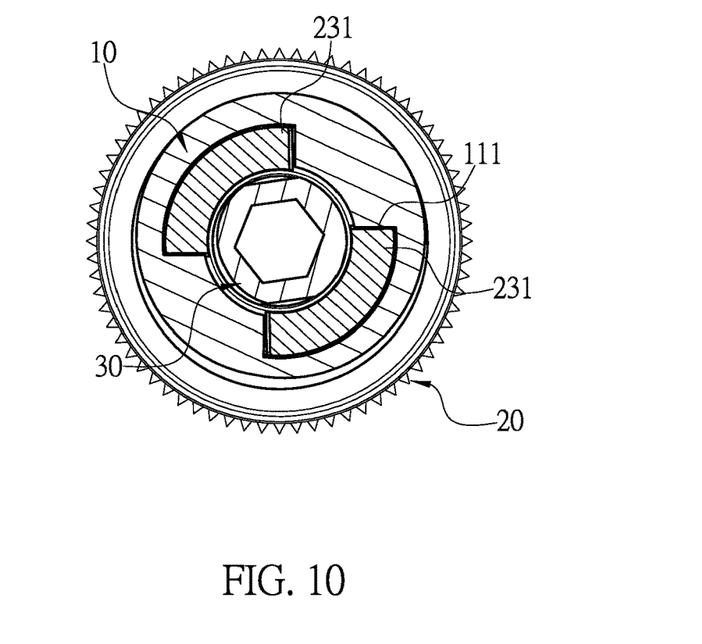
FIG. 10 is a cross-sectional view showing a combination of another preferred embodiment of the present invention.
Figure 11:
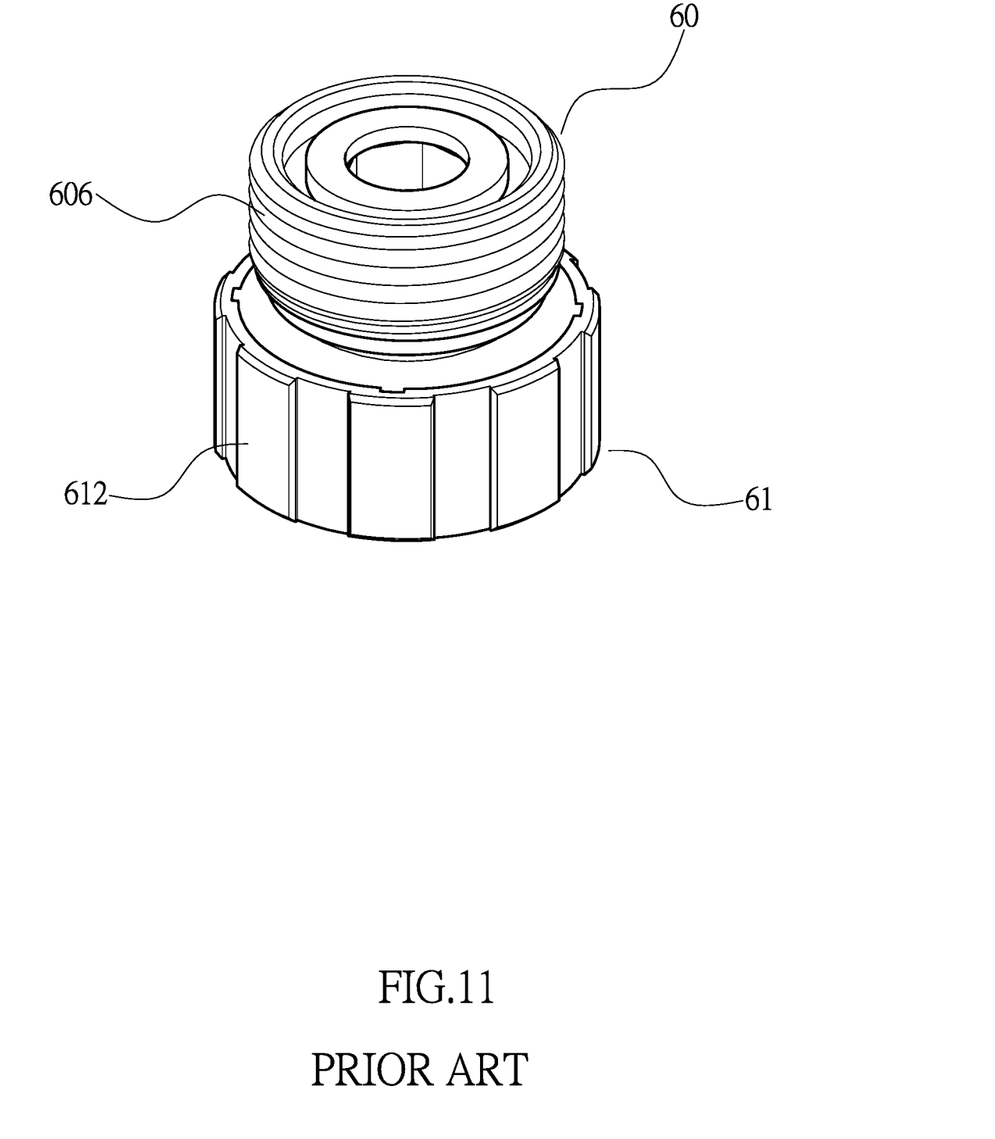
FIG. 11 is a prior art drawing.
Figure 12:
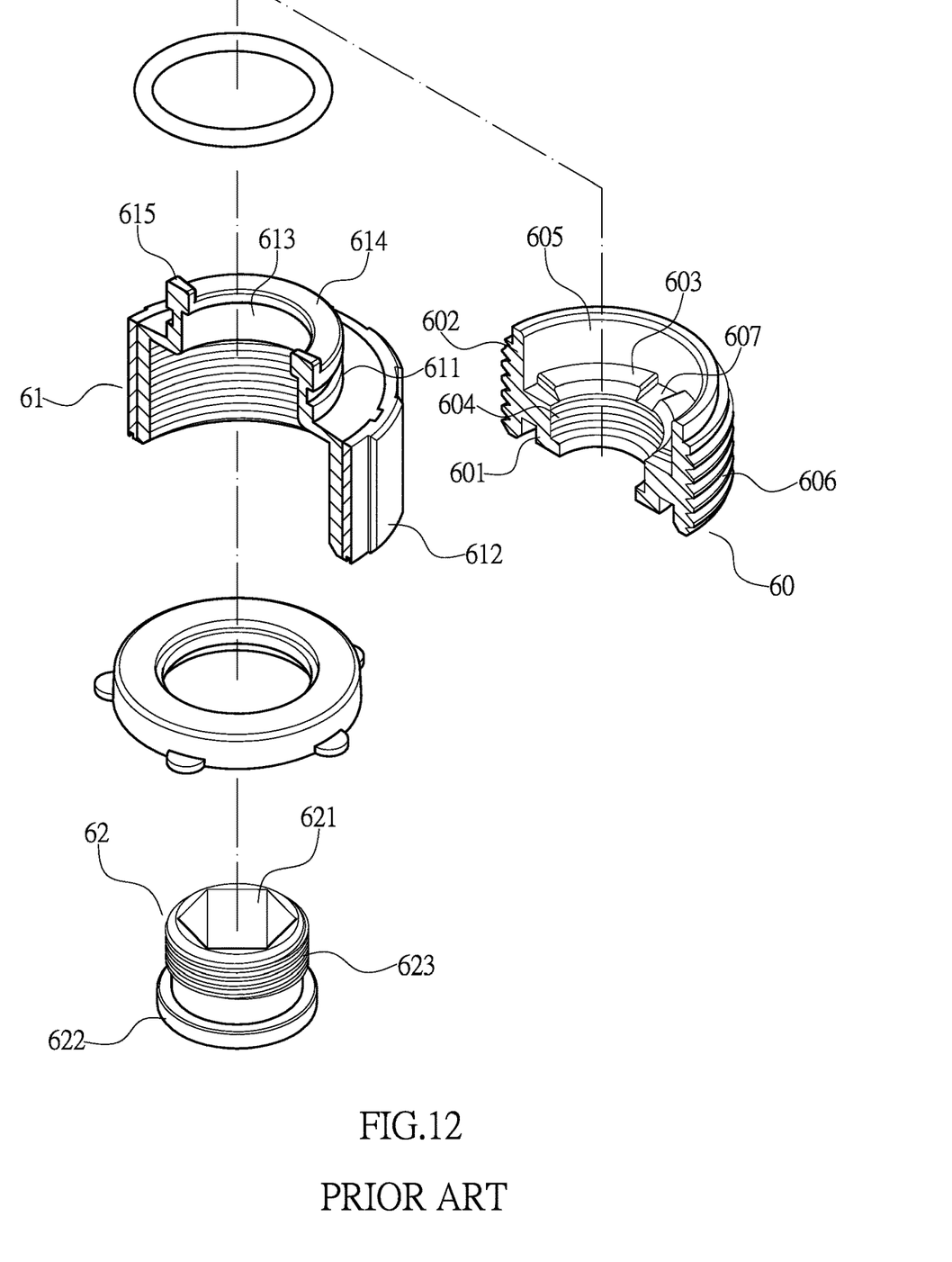
FIG. 12 is another prior drawing.
Figure 13:
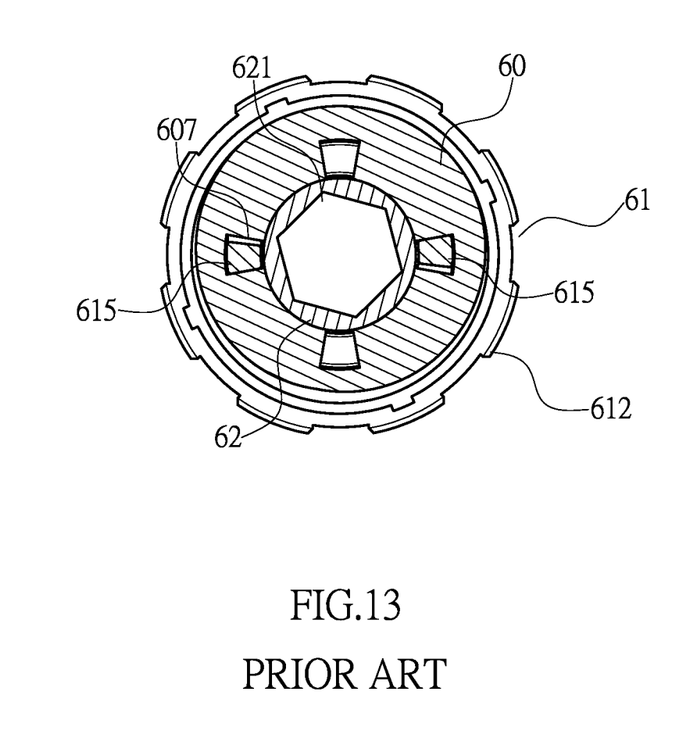
FIG. 13 is another prior art drawing.

The lip 23 has two extended arced engaging protrusions 231, and the first connecting joint 10 has two corresponding extended arced engaging grooves 111. Please refer to FIGS. 9 and 10, the two long arced engaging protrusion 231 makes large contact area to provide stability to the second connecting joint 20. Furthermore, the connecting duct 30 is hexagonal.

Figure 1:
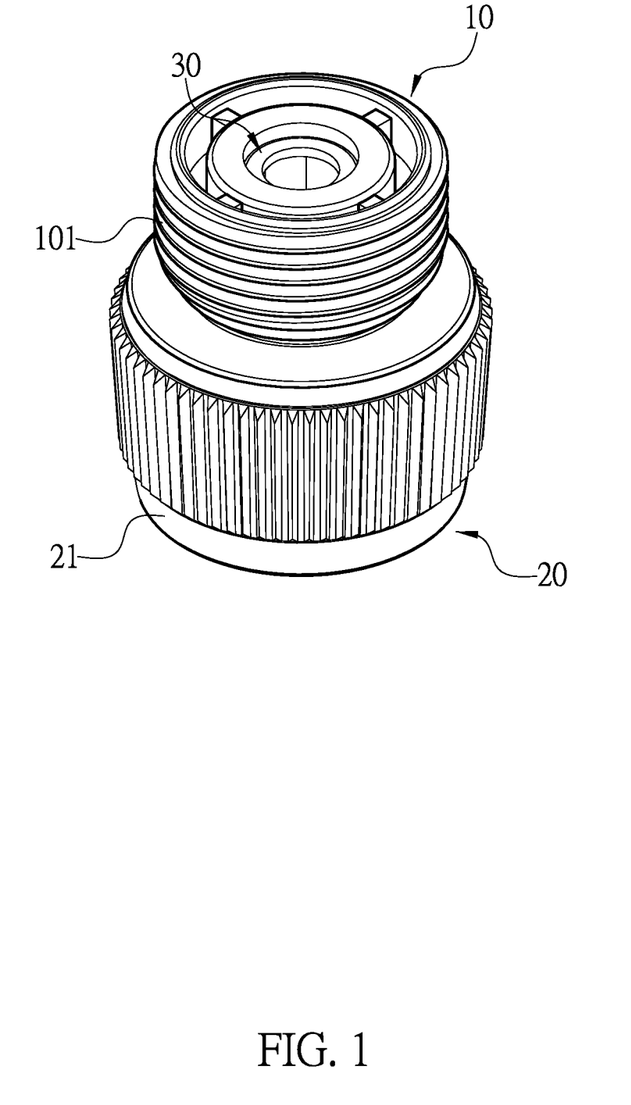
FIG. 1 is a three-dimensional combination of a preferred embodiment of the present invention.
Figure 2:
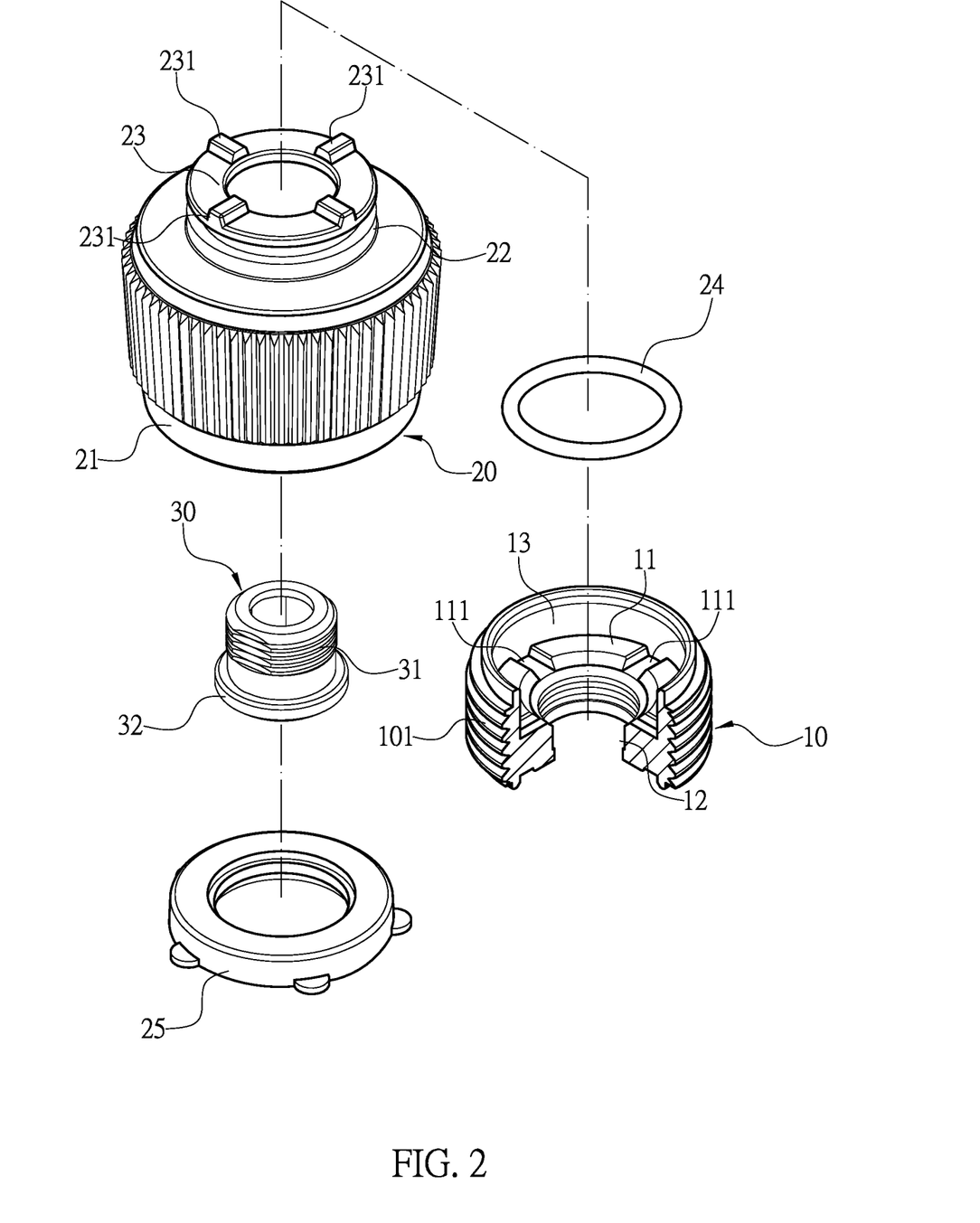
FIG. 2 is an exploded view of the preferred embodiment of the present invention.
Figure 3:
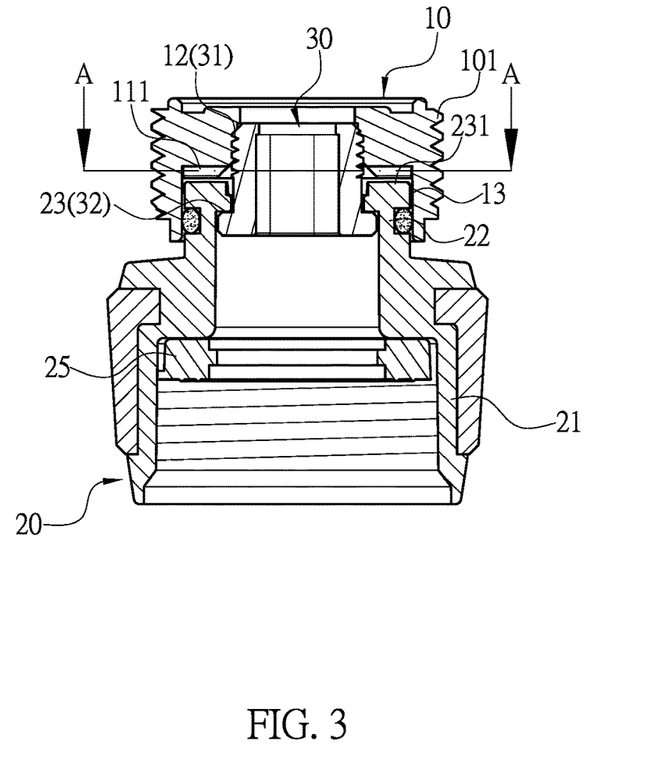
FIG. 3 is a sectional view of the preferred embodiment of the present invention.
Figure 4:
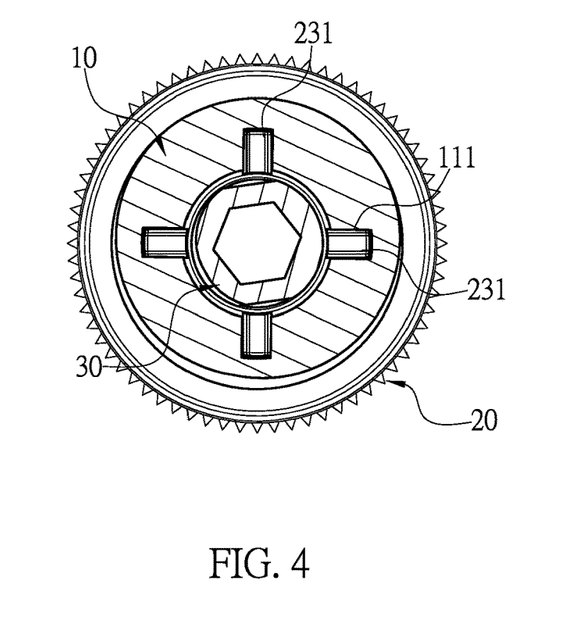
FIG. 4 is cross-sectional view along line A-A shown in FIG. 3.
Figure 5:
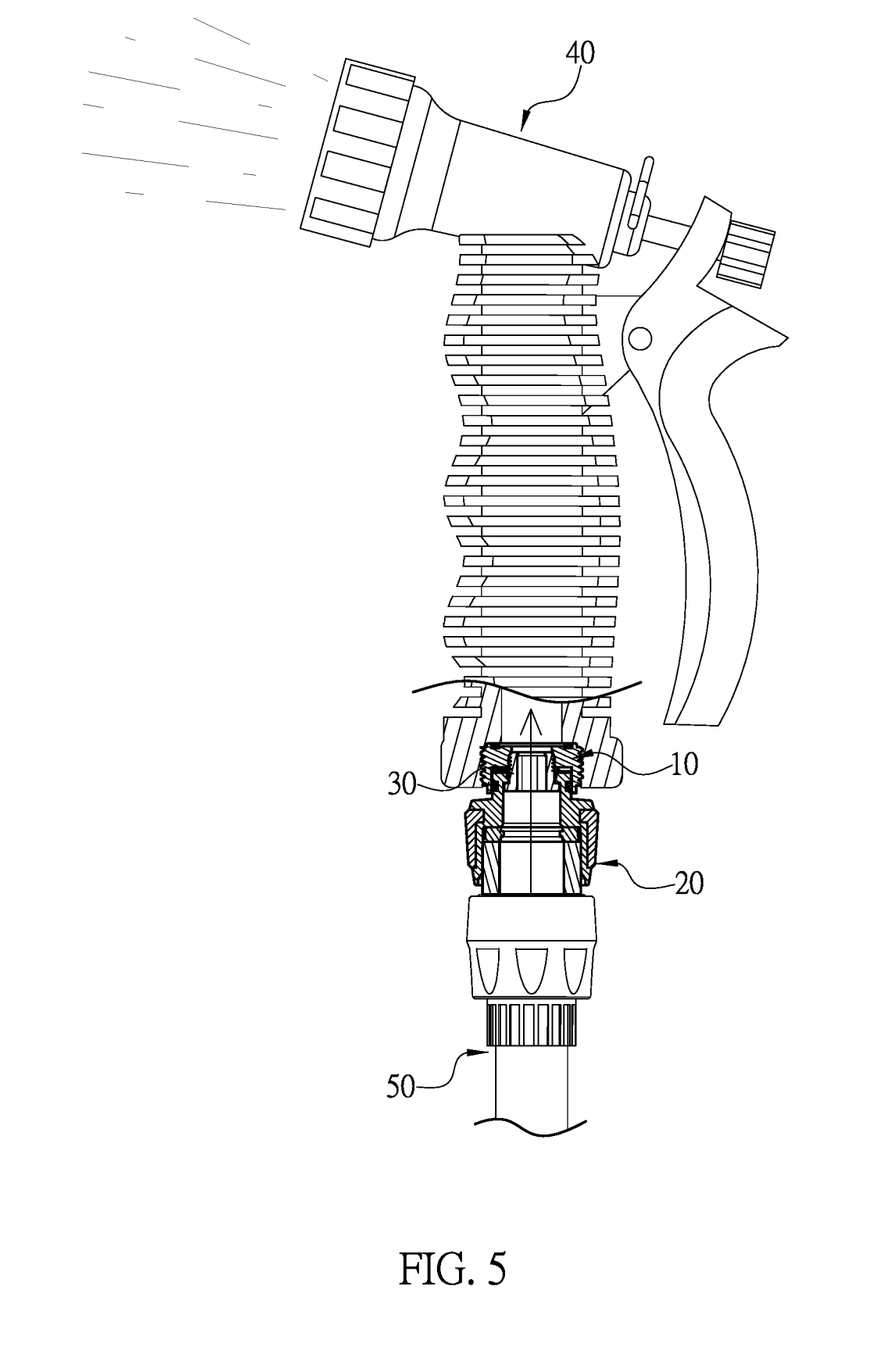
FIG. 5 is a drawing showing the use state according to the preferred embodiment of the present invention.
Figure 6:
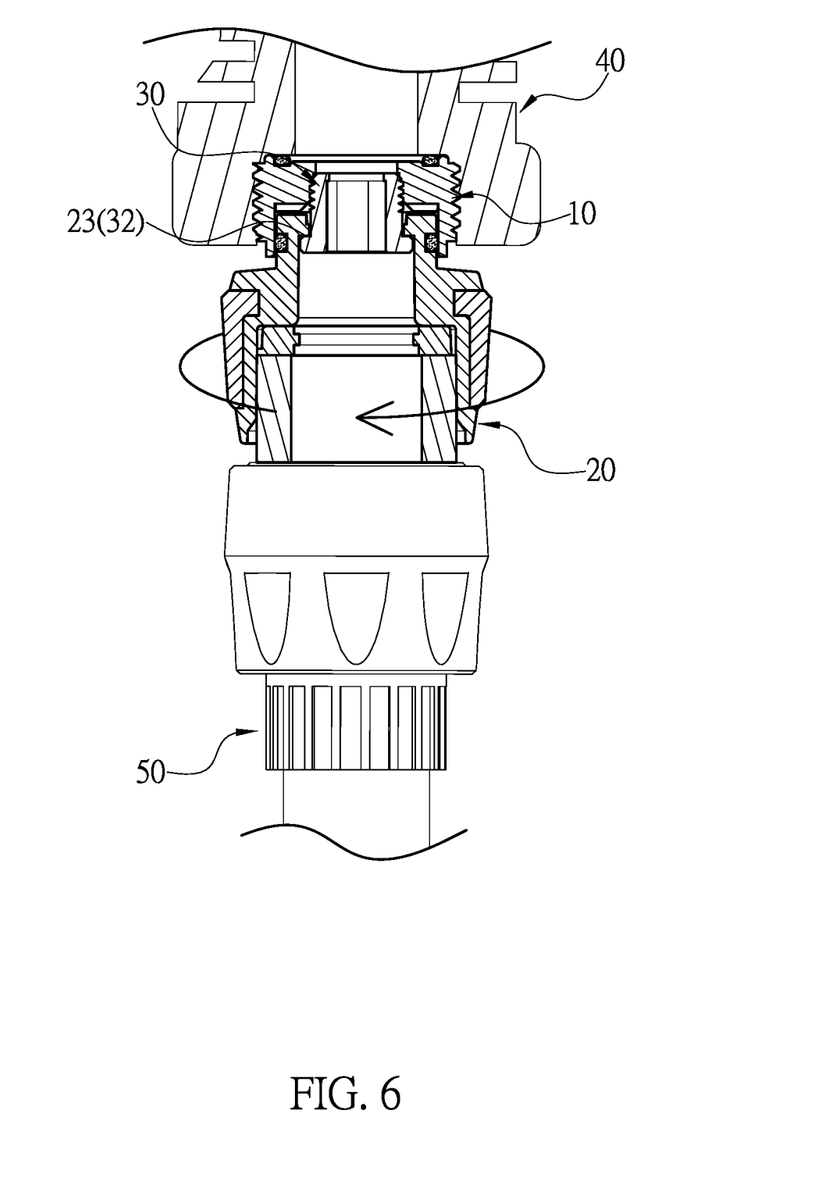
FIG. 6 is a drawing showing the anti-winding state according to the preferred embodiment of the present invention.
Figure 7:
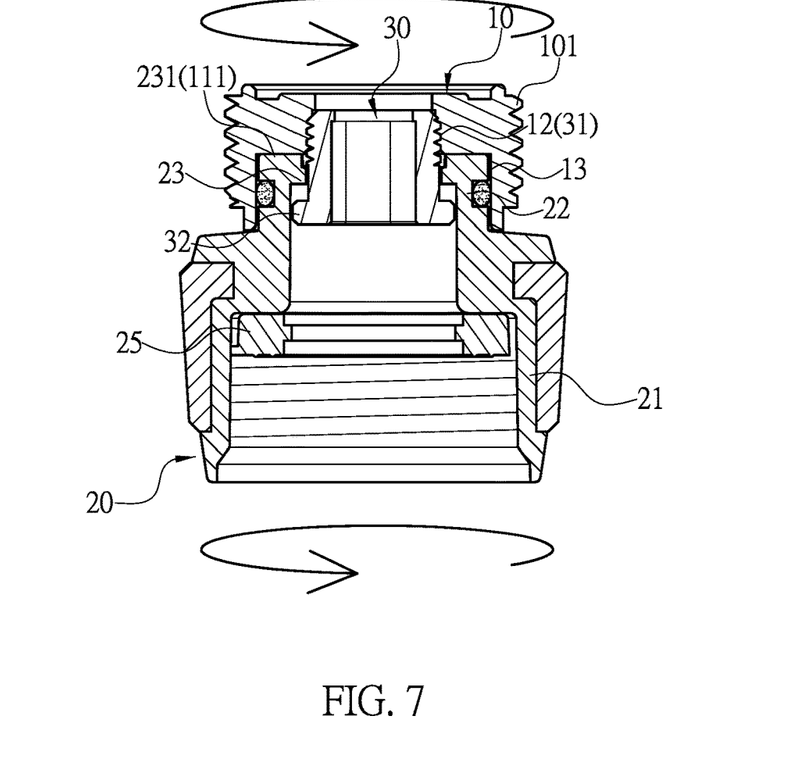
FIG. 7 is a drawing showing the rotation state of the hose connector being disassembled according to the preferred embodiment of the present invention.
Figure 8:
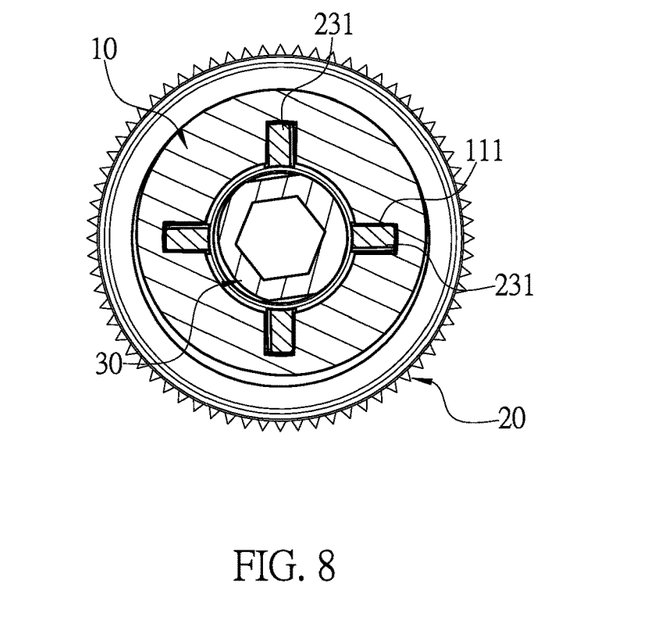
FIG. 8 is a drawing showing the disengaging state when the garden hose connector is disassembled according to the preferred embodiment of the present invention.

In the actual use, the water spray gun 40 and the water pipe 50 are connected via the threaded portion 101 of the first connecting joint 10 and the hollow base 21 of the second connecting joint 20, so that the first connecting joint 10 is completely concealed in the water spray gun 40, as shown in FIG. 5, to greatly shorten the exposed length of the hose connector. Since the first connecting joint 10 and the second connecting joint 20 are able to mutually rotated, as shown in FIG. 6, it can prevent the water pipe 50 from being twisted and entangled during the water spray, and the convenience of water operation is greatly improved. When the hose connector needs to be disassembled, as shown in FIGS. 7 and 8, the user holds the hollow base 21 of the second connecting joint 20 and pushes towards to the first connecting joint 10 in a rotating manner so that the engaging protrusions 231 of the second connecting joint 20 are embedded in the engaging groove 111 of the first connecting joint 10 to lock or release the first connecting joint 10 while the second connecting joint 20 is rotated. Therefore, the hose connector can be easily detached from the water spray gun 40.

With the structure of the above specific embodiment, the following benefits can be obtained: 1. The engaging protrusions 231 of the second connecting joint 20 are simultaneously embedded with the engaging groove 111 of the first connecting joint 10, which provide multiple contact points or even large contact area making the second connecting joint 20 to not sway and tilt due to unsmooth applied rotating force, so that the hose connector can be more easily disassembled. 2. The second connecting joint 20 provides multi contact points or large contact area via the engaging protrusion 231 on the neck rim 11, so that the second connecting joint 20 is free from being pulled by the water pipe 50 in all directions, to avoid unnecessary troubles.

Although the present invention has been explained in relation to its preferred embodiment, it is to be understood that many other possible modifications and variations can be made without departing from the spirit and scope of invention as hereinafter claimed.

What is claimed is:

1. A hose connector comprising: a first connecting joint, a second connecting joint, and a connecting duct, wherein:
   the first connecting joint comprises an inner neck rim having an inner threaded aperture and a containment space connecting to the inner threaded aperture below the neck rim, the first connecting joint further comprising a threaded outer wall, and a bottom surface of the neck rim above the containment space having a plurality of engaging grooves;
   the second connecting joint comprises a hollow base having a neck section connected to a lip, the neck section of the second connecting joint configured for insertion in the containment space of the first connecting joint, a top surface of the lip having a plurality of engaging protrusions pushing against the neck rim or engaging with the engaging grooves;
   the connecting duct comprises an outer threaded section and an enlarged flange, the connecting duct mounted through the neck section and the lip of the second connecting joint such that the outer threaded section of the connecting duct engages with the inner threaded aperture of the first connecting joint; and
   with the lip and the flange abutting against each other, the connecting duct is blocked from escaping from the second connecting joint such that the second connecting joint is capable of rotation relative to the combination of the first connecting joint and the connecting duct.

2. The hose connector as claimed in claim 1, wherein the neck section of the second connecting joint is sleeved with at least one sealing ring making contact with an inner wall of the containment space.

3. The hose connector as claimed in claim 1, wherein the hollow base is mounted with a sealing washer.

4. The hose connector as claimed in claim 1, wherein the hollow base is provided with an anti-slip surface.

5. The hose connector as claimed in claim 1, wherein the lip has four engaging protrusions.

6. The hose connector as claimed in claim 1, wherein the lip has two extended arced engaging protrusions, and the first connecting joint has two corresponding extended arced engaging grooves.

7. The hose connector as claimed in claim 1, wherein the connecting duct is hexagonal.

* * * * *